(12) United States Patent
Navada et al.

(10) Patent No.: US 8,761,169 B2
(45) Date of Patent: *Jun. 24, 2014

(54) PACKET FORWARDING

(75) Inventors: Muraleedhara Herur Navada, Santa Clara, CA (US); Hitesh Rastogi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/312,868

(22) Filed: Dec. 6, 2011

(65) Prior Publication Data

US 2012/0201242 A1 Aug. 9, 2012

Related U.S. Application Data

(63) Continuation of application No. 10/749,792, filed on Dec. 31, 2003, now Pat. No. 8,085,772.

(51) Int. Cl.
*H04L 12/56* (2006.01)
(52) U.S. Cl.
USPC .......................................................... 370/389
(58) Field of Classification Search
CPC ..... H04L 12/56; H04L 2012/56; H04L 65/00; H04L 45/00; H04L 45/02; H04L 45/04
USPC ............................ 370/389, 351, 392, 394, 254
See application file for complete search history.

(56) References Cited

U.S. PATENT DOCUMENTS

| 5,721,820 | A | * | 2/1998 | Abali et al. .................... 709/243 |
| 6,111,858 | A | | 8/2000 | Greaves et al. |
| 6,425,015 | B1 | | 7/2002 | Jennings et al. |
| 6,490,276 | B1 | * | 12/2002 | Salett et al. .................... 370/360 |
| 6,496,502 | B1 | | 12/2002 | Fite et al. |
| 8,085,772 | B2 | | 12/2011 | Navada et al. |
| 2002/0012345 | A1 | | 1/2002 | Kalkunte et al. |
| 2002/0085551 | A1 | | 7/2002 | Tzeng |
| 2003/0147412 | A1 | | 8/2003 | Weyman et al. |
| 2005/0147113 | A1 | | 7/2005 | Brown |
| 2005/0198362 | A1 | | 9/2005 | Navada et al. |
| 2005/0243818 | A1 | | 11/2005 | Foglar et al. |
| 2006/0013212 | A1 | | 1/2006 | Singh et al. |

FOREIGN PATENT DOCUMENTS

EP 1345359 A 9/2003

OTHER PUBLICATIONS

"Office Action for European Patent Application No. EP 04 815 426.4", (Mar. 15, 2010), Whole Document.
"Office Action for European Patent Application No. EP 04 815 426.4", (Jul. 18, 2008), Whole Document.
"Office Action for U.S. Appl. No. 10/749,792", (May 17, 2007), Whole Document.
"PCT, International Preliminary Report on Patentability for International Application No. PCT/US2004/043348", (Jul. 3, 2006), Whole Document.
PCT/US2004/043348, International Search Report and Written Opinion of the International Searching Authority mailed Jun. 30, 2006, 9 pages.

* cited by examiner

*Primary Examiner* — Raj Jain
*Assistant Examiner* — Zhiren Qin
(74) *Attorney, Agent, or Firm* — Blakely, Sokoloff, Taylor & Zafman LLP

(57) ABSTRACT

A method includes inserting a vector in a packet that identifies a first device in a stack of packet forwarding devices to receive the packet.

14 Claims, 7 Drawing Sheets

70 — STACK DEVICE TABLE STORED IN ROUTER 28

| STACK DEVICE NUMBER | ROUTER 28 PORT NUMBER |
|---|---|
| 30 | 6 |
| 32 | 6 |

72 — STACK DEVICE TABLE STORED IN ROUTER 30

| STACK DEVICE NUMBER | ROUTER 30 PORT NUMBER |
|---|---|
| 28 | 2 |
| 32 | 6 |

74 — STACK DEVICE TABLE STORED IN ROUTER 32

| STACK DEVICE NUMBER | ROUTER 32 PORT NUMBER |
|---|---|
| 28 | 1 |
| 30 | 1 |

*FIG. 4*

PACKET FORWARDING

This is a Continuation of U.S. application Ser. No. 10/749,792, filed Dec. 31, 2003 now U.S. Pat. No. 8,085,772.

BACKGROUND

Network switches, routers, and the like are used to distribute information through networks by sending the information in segments such as packets. A packet typically includes a "header" that stores a destination address for routing the packet and a "payload" that stores a segment of the information being sent through the network. To forward the packet to an intended destination, some networks include a group of routers that appear as a single large router, known as a stack, to network devices external to the stack. By grouping the routers to produce a stack, various administrative functions and operational rules are shared among the routers in the stack that route packets to their intended destinations.

DESCRIPTION OF DRAWINGS

FIG. 4 depicts tables for routing packets in a stack of routers.

DESCRIPTION

Figure 1:
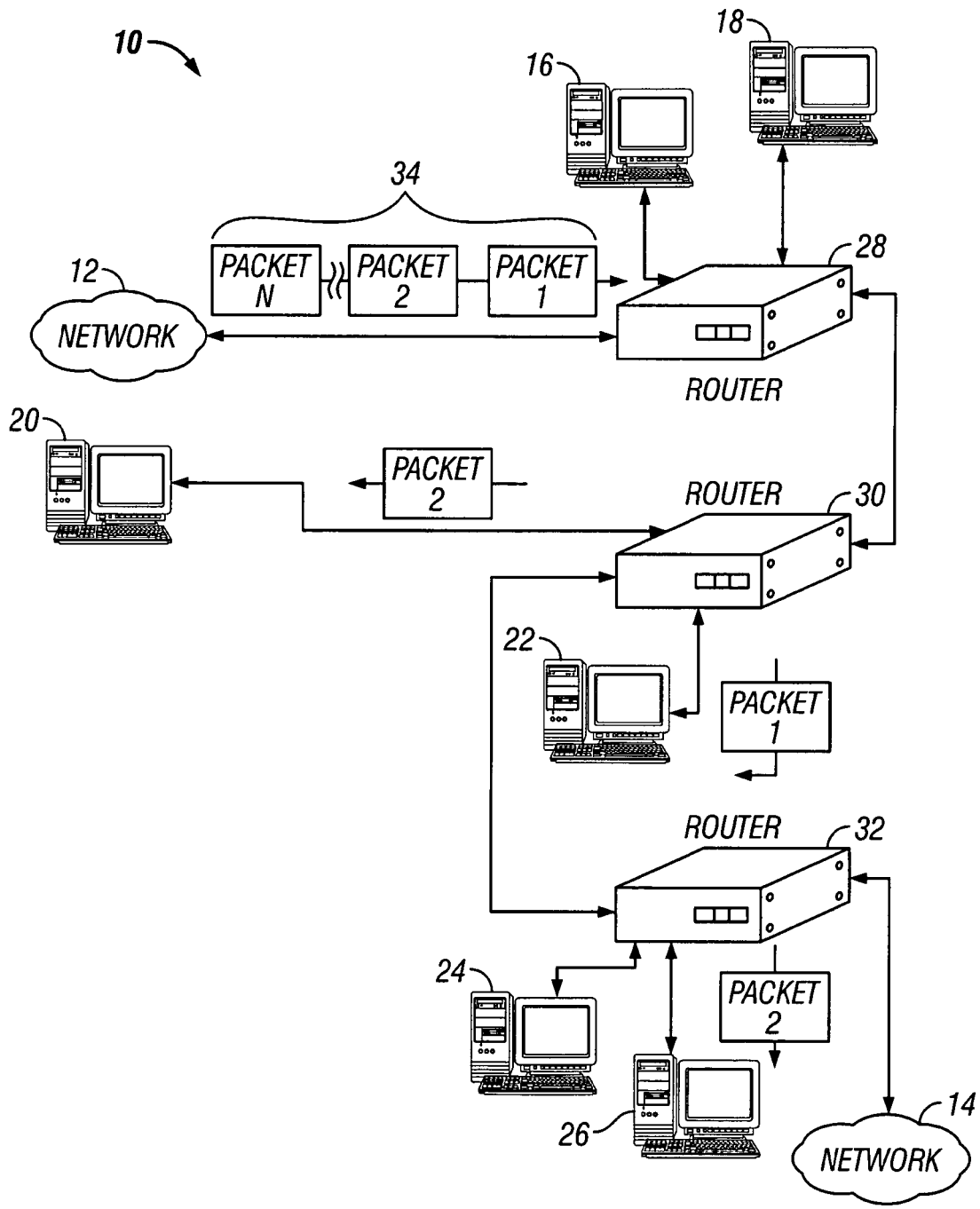
FIG. 1 is a block diagram depicting a system for forwarding packets.

Referring to FIG. 1, a system 10 for transmitting packets between networks 12, 14 (e.g., local area networks (LANs), wide area networks (WANs), the Internet, etc.) and computer systems 16-26 includes three routers 28, 30, 32 that are connected to produce a stack of routers. In one example, each router is located on a separate floor of a building and delivers packets to the computer systems connected to the router. For example, router 28 may be located on the top floor of a building and deliver packets to computer systems 16, 18 located on the floor. In this arrangement the routers 28-32 are used to produce a stack and to deliver packets, however in other arrangements the system 10 includes a stack of network switches, hubs, or other packet forwarding devices. Furthermore, the stack may include a combination of different types of packet forwarding devices. For example, a stack produced with a combination of network switches and routers may be included in system 10.

In this particular example, a stream of packets 34 is received by the stack through router 28 from network 12. Once received, the individual packets included in packet stream 34 are delivered to their intended destination(s) as provided by header data of each respective packet. For example, the header of packet_1 includes data representing that the packet is destined for computer system 22. Similarly, packet_2 includes a header, however, this packet is intended for delivery to computer systems 20 and 26. In another example, one or more of the packets included in the packet stream 34 are destined for network 14 for delivery to one or more computer systems or other types of destinations (e.g., servers, personal digital assistants (PDAs), cellular phones, etc.).

To transfer packets among the computer systems and the networks, based on their intended destination(s), packets and copies of packets are passed among the routers in the stack. For example, to deliver packet_2 to computer system 26, the packet is passed from router 28 to router 30 and then to router 32. Packet_2 then exits the stack by being delivered from router 32 to computer system 26. Once packet_2 enters the stack, the packet is directed through the routers included in the stack by data referred to as a "device vector", which is inserted into the header of the packet. The device vector is used by each router to determine the appropriate port or ports of the router to efficiently send the packet through the stack. By inserting a device vector in each packet that enters the stack, packet processing time is reduced since each router does not need to individually determine the destination(s) of each packet being passed about the stack. By reducing processing time, conserved clock cycles can be used for other processing operations of the routers such as packet forwarding.

Figures 1, 2A:
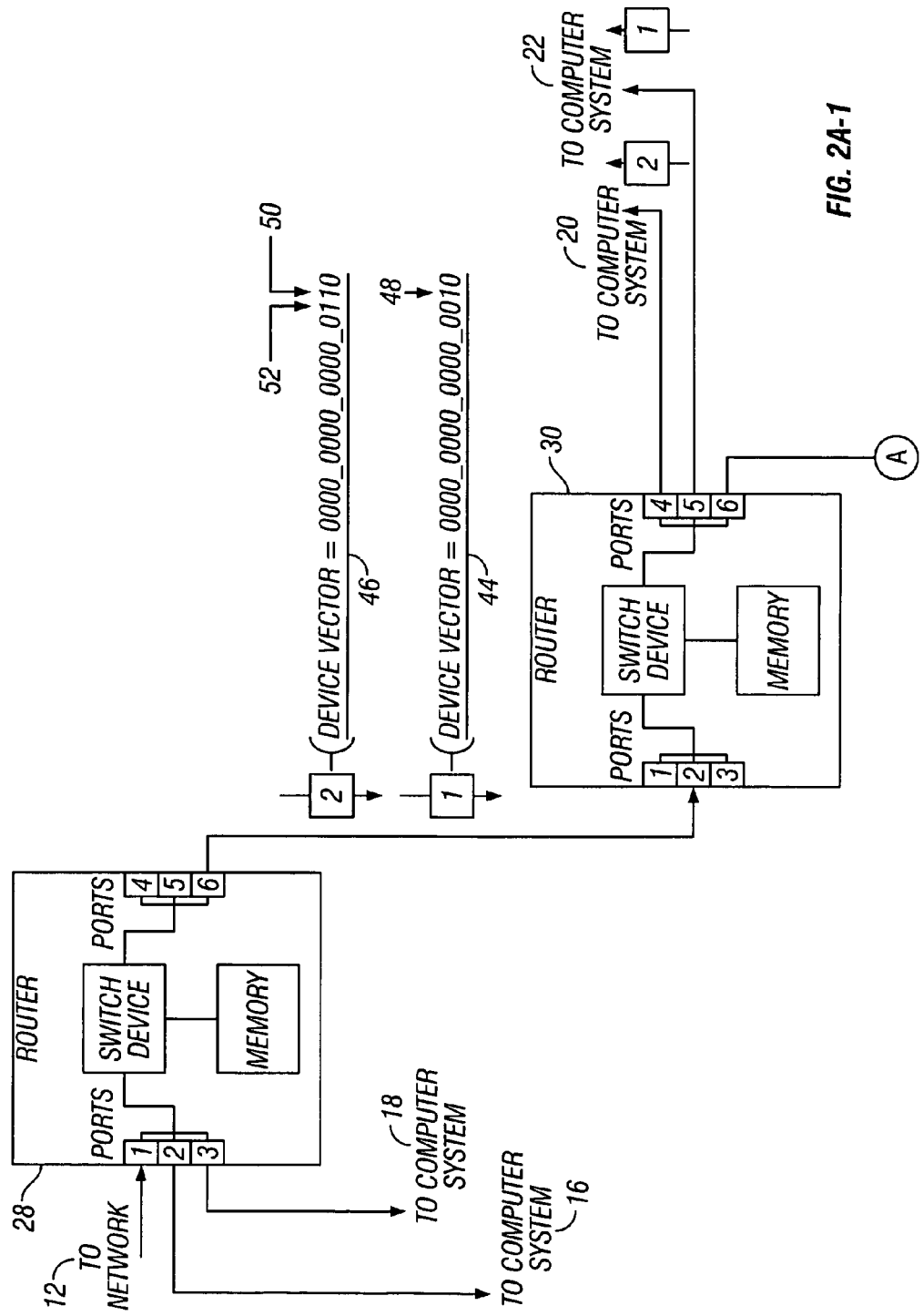
FIG. 2A is a block diagram depicting a stack of routers.
Figures 2, 2A:
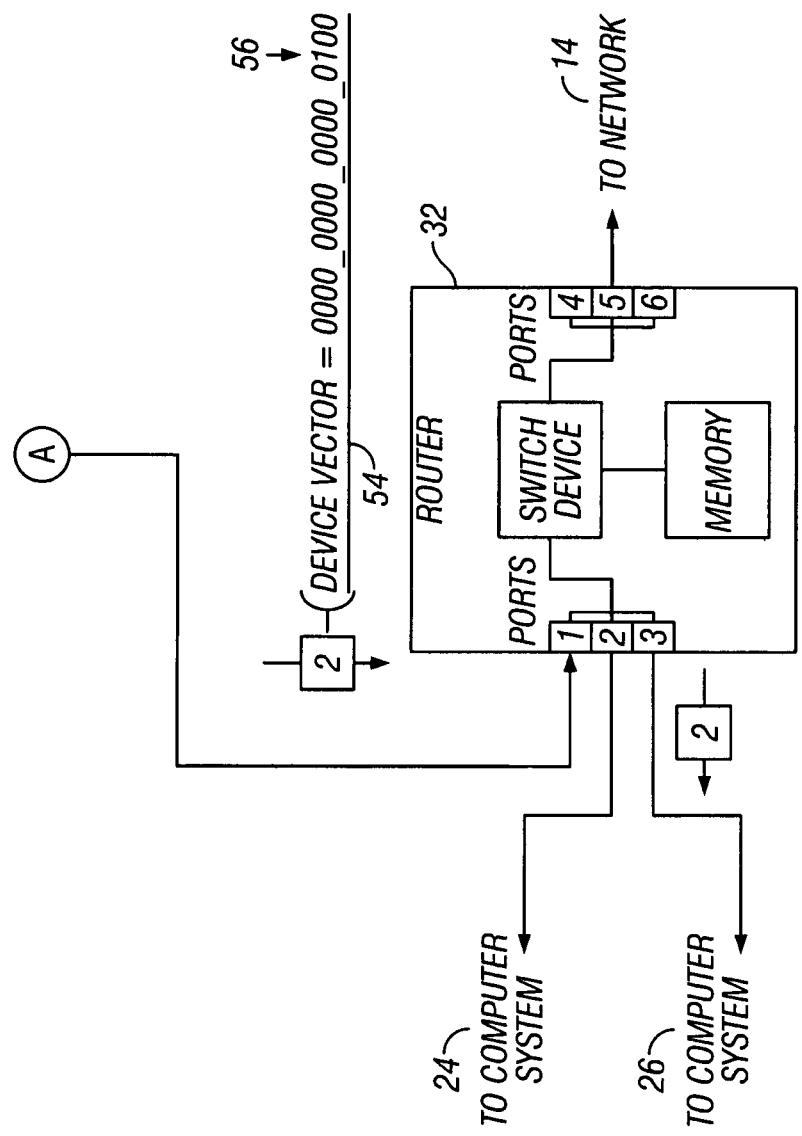
Figure 2B:
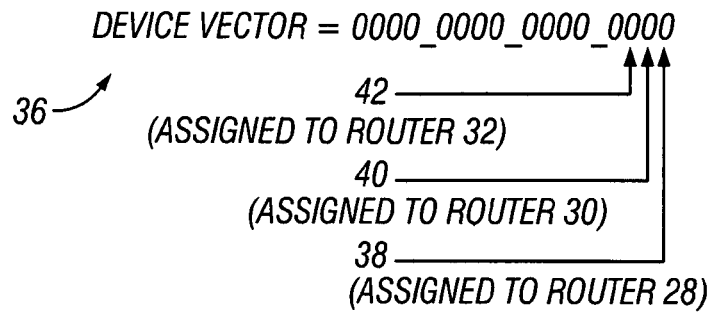
FIG. 2B depicts a device vector.

Referring to FIGS. 2A and 2B, each of the routers 28-32 in the stack includes six ports (e.g., ports 1-6) that allow bi-directional packet transferring among the routers. For example, port 6 in router 28 connects to port 2 in router 30. Similarly, port 6 in router 30 connects to port 1 in router 32 for transferring packets in either direction. Also, particular ports in the routers 28-32 respectively connect to computer systems 16-26 and the networks 12, 14. For example, port 2 in router 28 connects to computer system 16 and port 3 connects to computer system 18. Similarly, port 1 in router 28 connects to network 12 for bi-directional packet transfer. In this particular example, each router 28-32 includes six ports for transferring packets. However, in other arrangements each of the routers 28-32 includes more than six ports (e.g., 24 ports, 48 ports, etc.) so that the port aggregate of the stack is larger (e.g., 72 ports, 144 ports, etc.) compared to the eighteen-port aggregate produced by the three six-port routers in the stack. Although, one or more of the routers 28-32 may include less than six ports. Also, while this stack includes three routers 28-32, in other arrangements, more or less routers or other types of packet forwarding devices are connected to produce a stack and deliver packets. In some arrangements the stack of packet forwarding devices is implemented on a smaller scale. For example, the stack of packet forwarding devices is implemented in a processor (e.g. a microprocessor, packet processor, etc.) or a group of processors.

Once a packet has entered the stack of routers 28-32, a device vector, such as device vector 36, is inserted in the header of the packet to assist the packet being routed through the stack. However, if a packet enters a router in the stack that is connected to the packet's destination, which is external to the stack, a device vector is not inserted. For example, if a packet is received by router 28 from network 12 that is destined for computer system 16, a device vector is not inserted since the packet does not need to be sent to another router or other device in the stack for delivery to computer system 16.

The device vector is an entry that includes data to identify which router or routers in the stack need to receive the packet. Typically the device vector is inserted by the first router, or other type of packet forwarding device (e.g., network switch, hub, etc.) to first receive the packet in the stack. For example, since the packet stream 34 is received in the stack by router 28, router 28 inserts a device vector into appropriate packets (e.g., packet_1, packet_2, etc.) included in the packet stream. Alternatively, if one or more packets are received by router 32 from the network 14, router 32 is the stack ingress point and inserts a device vector into appropriate received packets.

Since the device vector is used for directing packets among the routers 28-32 included in the stack, the device vector is typically removed from the packet when the packet exits the stack of routers 28-32. For example, prior to a packet being passed to network 14 through port 5, router 32 removes the device vector from the packet. Similarly, as a packet is passed to computer system 16, the router 28 removes the device vector prior to sending the packet through port 2.

Each device vector includes data that identifies which router or routers need to receive the packet so that the packet is delivered to its intended destination outside the stack. For example, since the intended destination of packet_1 is computer system 22, the packet needs to be transferred from router 28 to router 30 for delivery to computer system 22. So, the device vector inserted in packet_1 identifies router 30. Similarly, since packet_2 is intended for computer systems 20 and 26, the device vector inserted in packet_2 identifies both routers 30 and 32 to respectively deliver a copy of packet_2 to computer systems 20 and 26. In another example, if a packet is to be transferred from the stack to network 14, the device vector includes data that identifies router 32 since packets destined for network 14 are sent out of the stack by router 32.

To identify the particular router or routers that need to receive a packet for delivery to one or more of the computer systems 16-26 or networks 12, 14, the device vector 36 that is inserted into a packet includes a series of bits that are individually assigned to one of the routers 28-32 in the stack. For example, the device vector 36 includes sixteen bits, in groups of four, to represent sixteen routers or other packet forwarding devices included in the stack. Here, least significant bit 38 in device vector 36 indicates whether the associated packet needs to be sent to router 28 and bit 40 indicates whether the packet needs to be sent to router 30. Progressing through the bits, bit 42 represents if the packet needs to be sent to router 32. Since this example includes three routers, three bits 38-40 are needed to assign a bit to each router. However, since device vector 36 includes sixteen bits, the remaining thirteen bits can be used in other arrangements for assigning to additional packet forwarding devices included in the stack in system 10. Also, while device vector 36 includes sixteen bits for assigning to routers or other packet forwarding devices, in other arrangements the device vector includes more or less bits.

In this example, router 28 inserts device vector 44 in packet_1 and device vector 46 in packet_2. Also, since packet_1 is intended for delivery to computer 22, bit 48 associated with router 30 is set to a logic "1" to identify that packet_1 is to be delivered to router 30. Similarly, for packet_2, bit 50, which is associated with router 30 is also set to logic "1" to represent that packet_2 be sent to router 30 for delivering the packet to computer system 20. Furthermore, since packet_2 is intended for computer system 26, bit 52 in device vector 46 is set to logic "1" to identify that the packet needs to be sent to router 32. While a logic "1" is used to identify a router to receive a particular packet, alternatively, in other arrangements, logic states may be reversed such logic "0" is stored in an appropriate device vector bit to identify the particular router to receive a packet.

After receiving a packet with an inserted device vector, the recipient router uses the device vector bits to determine the next destination for the packet. For example, after receiving packet_1 on port 2, router 30 uses device vector 44 to determine that the packet needs to be sent to computer system 22, which is connected to port 5. Since bit 48 is the only device vector 44 bit set to a logic "1", the router 30 relatively quickly determines that packet_1 is intended for one or more of the devices (e.g., computer systems 20 and 22) connected to router 30 that are external to the stack. Typically, router 30 accesses data stored in the header of packet_1 to determine the particular device (e.g., computer system 22) external to the stack that is the intended destination of packet_1.

Similar to packet_1, device vector 46 inserted in packet_2 has bit 50, which is also associated with router 30, set to a logic "1" so that packet_2 is delivered over port 4 of router 30 to computer system 20. Additionally, bit 52 associated with router 32 is also set to a logic level "1" to identify that packet_2 be sent to router 32. Typically, router 30 produces a copy of packet_2 for sending to router 32. Prior to sending the copy of packet_2, device vector 54 is inserted in the packet to identify that router 32 deliver the packet to a connected device (e.g., computer system 26, network 14, etc.) external to the stack. In this example, since packet_2 is intended for computer system 26, which is connected to port 3 of router 32, bit 56 associated with router 32 is set to a logic "1". Upon receiving the copy of packet_2, router 32 identifies that packet_2 is intended for delivery to computer system 26 by accessing header data in the packet. Device vector 54 includes data that is a subset of the data stored in device vector 46. In particular, device vector 46 has two bits 52, 50 set to logic "1" to identify routers 30 and 32, while device vector 54 only has bit 56 set to logic "1" since router 30 has delivered a copy of packet_2 to computer system 20.

Prior to sending packet_2 to computer system 26, router 30 removes device vector 54 from the packet. Similarly, prior to delivering packet_1 to computer system 22 and delivering packet_2 to computer system 20, device vectors 44 and 46 are respectively removed since the packets are exiting the stack. Also, since packets are typically not returned to stack devices from which they are sent, infinite packet circulation is avoided.

In this example, packets passed among the routers 28-32 in the stack are received from network 12 and are delivered to computer systems 20, 22, and 26, which are respectively connected to routers 30 and 32. However, in other examples, packets are received by the stack from network 14 or packets are delivered to network 14. Furthermore, packets may be passed in other directions, for example, packets may be sent to network 12 from port 1 of router 28.

Figure 3:
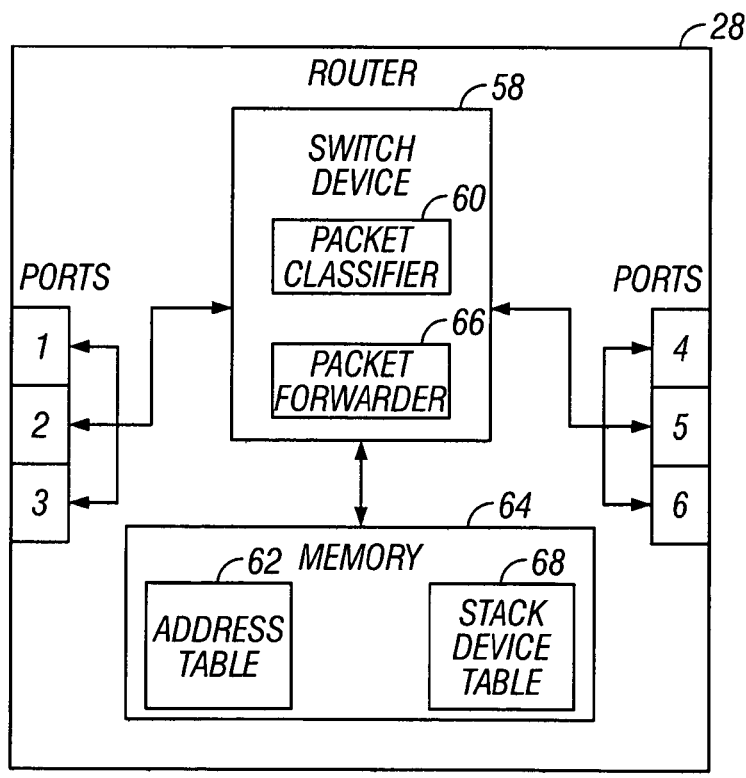
FIG. 3 is a block diagram depicting a router.

Referring to FIG. 3, router 28 includes six ports for sending and receiving packets, however, in other arrangements the router includes more (e.g., twenty-four ports) or less ports. As packets are received by router 28, the packets are passed to a switch device 58, for example an Intel® IXE 7424 Media Switch Device, which determines the intended destination of the packets and the appropriate port(s) to send each packet. For example, both packet_1 and packet_2, which are received on port 1, (shown in FIG. 2A) are sent over port 6 to router 30.

A packet classifier 60 is executed by the switch device 58 to determine the destination of a packet if the packet is received from a device (e.g., network 12, computer system 16, etc.) external to the stack. To determine a packet destination, packet classifier 60 accesses data stored in the header of the packet and compares it to data stored in an address table 62 that is stored in a memory 64 (e.g., random access memory (RAM), static RAM (SRAM), dynamic RAM (DRAM), read-only memory (ROM), etc.) included in router 28. Also, packets received from devices external by the stack do not include device vectors for directing the packets among the routers 28-32 in the stack. The packet classifier 60 produces and inserts a device vector in the appropriate packets so that each of the routers 28-32 can relatively quickly determine the next router or routers to route the respective packets to. Alternatively, if a packet has already entered the stack and is received from one of the other routers (e.g., router 30, etc.) or another stack device, router 28 accesses the device vector stored in the packet to determine the next, if any, router in the stack to send the packet or a copy of the packet.

To determine the router or routers to send a packet, a packet forwarder 66 executed by the switch device 58 accesses the device vector inserted in the packet and identifies which bits in the device vector are set to logic "1". For example, device vector 44 in packet_1 includes bit 48 that is associated with router 30 and is set to logic "1". After identifying that bit 48 is set to logic "1", packet forwarder 66 accesses a stack device table 68 to determine the particular port or ports in router 28 to send the packet. In this example, switch device 58 uses stack device table 68 to determine that packet_1 be sent through port 6 for delivering the packet to router 30.

Prior to sending a packet, packet forwarder 66 also changes device vector data stored in the packet to reflect that the packet is being sent to another router in the stack. For example, upon receiving packet_2, packet classifier 60 sets bits 50 and 52 in device vector 46 to logic "1" so that a copy of the packet is sent to routers 30 and 32. However, after packet_2 is received by router 30, device vector 54 stored in the copy of packet_2 sent to router 32 only has bit 56, which is associated router 32, set to logic "1" since the packet has already been delivered router 30. By changing the logic stored in the device vector bits as a packet propagates through the stack, the device vector identifies the next stack device or stack devices to receive the packet.

Both packet classifier 60 and packet forwarder 66 executed on switch device 58 are typically stored in the memory 64. However, in other arrangements either or both packet classifier 60 and the packet forwarder 66 are stored in a storage device (e.g., a hard drive, CD-ROM, etc.) in communication with the switch device 58. Also, in this example memory 64 is presented separate from the switch device 58. However, in other arrangements memory 64 is included in the switch device 58.

Referring to FIG. 4, stack device tables 70-74 respectively stored in routers 28, 30, and 32 include data for matching a destination router to the particular port for sending a packet. For example, stack device table 70, which is stored in router 28, identifies the port of router 28 for sending packets to routers 30 and 32. Packets sent through port 6 in router 28 are delivered to router 30, and from router 30 are sent to router 32. Similarly, stack device table 72, which is stored in router 30, is used determine the particular port in router 30 to use to send packets to routers 28 and 32. In particular, packets are delivered to router 28 by sending the packets through port 2 and packets are delivered to router 32 by sending the packets through port 6 of router 30. Also, stack device table 74, which is stored in router 32, is used to determine the particular port in router 32 to use to send packets to routers 28 and 30. In particular, packets to be delivered to either router 28 or 30 are sent through port 1 of router 32.

By accessing a device vector inserted in a packet, the packet forwarder executed in the recipient router determines which bits are set to logic "1" and then uses the stack device table stored in the router to determine the particular port or ports to send the packet or copies of the packet. For example, when packet_1 is received by router 28, packet forwarder 66 accesses stack device table 68 and determines that packet_1 is to be placed on port 1 for sending to router 30. Typically, each of the stack device tables 70-74 are respectively stored in memory included in each router such as stack device table 70 is stored in memory 64 of router 28. However, in some arrangements the stack device tables 70-74 are stored in one or more storage devices (e.g., hard drives, CD-ROMs, etc.) that are in communication with the respective routers 28-32.

Figure 5:
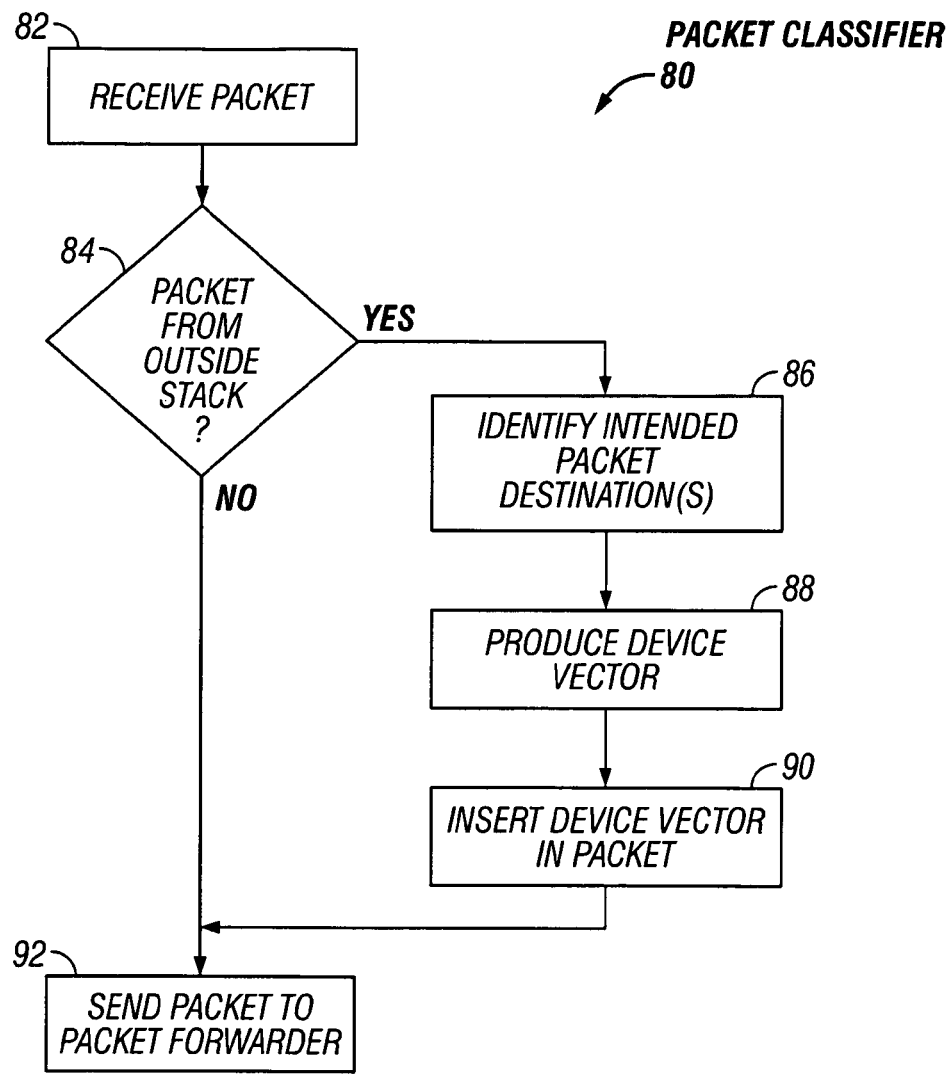
FIG. 5 is a flow chart of a portion of a packet classifier.

Referring to FIG. 5, a packet classifier 80 such as packet classifier 60 executed in switch device 58, includes 82 receiving a packet. Typically, the packet is received from a device (e.g., router 30, etc.) in a stack or from a source not included in the stack (e.g., network 12, computer system 16, etc.). After receiving the packet, the packet classifier 80 determines 84 if the packet is received from a source outside the stack. If the packet is received from a source external to the stack, the packet classifier 80 identifies 86 the intended destination(s) of the packet. Typically, to identify the intended destination(s), the packet classifier 80 accesses the header data stored in the packet and uses the data with data stored in an address table to identify one or more devices (e.g., router 30, router 32, etc.) in the stack to which the packet needs to be sent for delivering the packet to one or more intended destinations external to the stack (e.g., computer system 22, network 14, etc.).

The packet classier 80 also includes producing 88 a device vector, such as device vector 36, so that one or more stack devices use the device vector to determine the next stack device or devices to receive the packet or a copy of the packet. In one example, the produced device vector includes a group of bits in which each bit is assigned to a device in the stack and stores a logic "1" for representing that the assigned stack device is an intended destination of the packet or stores a logic "0" to represent that the packet is not intended for delivery to the assigned stack device. After the device vector is produced, the packet classifier 80 inserts 90 the produced device vector in the packet and sends 92 the packet to a packet forwarder for sending the packet to the intended destination(s). If the packet is received from a device (e.g., network switch 30, etc.) in the stack, a device vector has previously been inserted in the packet and the packet classifier 80 sends 92 the packet to a packet forwarder.

Figure 6:
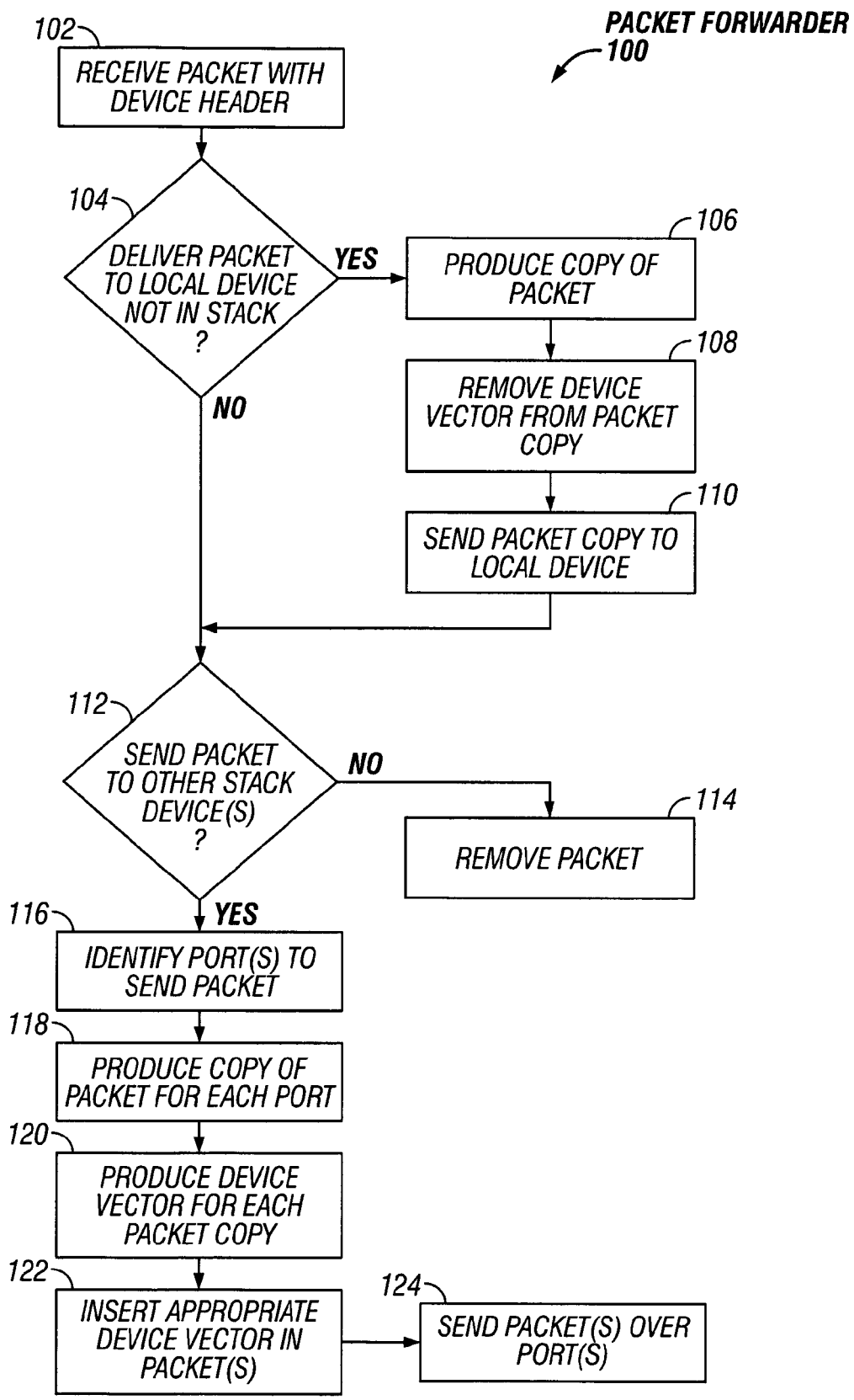
FIG. 6 is a flow chart of a portion of a packet forwarder.

Referring to FIG. 6, a packet forwarder 100, such as packet forwarder 66 executed in router 28, includes receiving 102 a packet with a device vector. Typically the packet is received from a packet classifier such as packet classifier 60 executed in the router 28. After the packet is received, the packet forwarder 100 determines 104 if the packet is intended for delivery to a computer system or other device that is not included in the stack but is connected to a port of the stack device (e.g., router 28) in which the packet forwarder 100 is executed. For example, the computer systems 16 and 18 (shown in FIG. 2) are external to the stack of the routers 28-32 but are connected to ports in router 28.

To determine if the received packet is intended for a computer system connected to the stack device in which the packet forwarder 100 is executed, the packet forwarder determines if the device vector bit assigned to the stack device is set for a logic "1". If the packet is intended for a computer system connected to the stack device in which the packet forwarder is executed, the packet forwarder 100 produces 106 a copy of the packet and removes 108 the device vector from the copy of the packet. Since the packet is delivered to a computer system or other type of destination outside of the stack, the device vector is no longer needed, so the device vector is removed so as not to cause problems at the delivery destination. After removing the device vector, the packet forwarder 100 sends 110 the copy of the packet to the computer system of other destination (e.g., network 12) outside the stack.

If the received packet is not intended for a computer system connected to the stack device in which the packet forwarder 100 is executed or once a copy of the packet is delivered to the local device external to the stack, the packet forwarder 100 determines 112 if the packet is to be sent to one or more other stack devices such as other routers, network switches, or other types of devices in the stack. Typically to determine if the packet is to be sent to another stack device, the packet forwarder 100 accesses the device vector stored in the packet and checks if any bits associated with other stack devices are set to logic "1". If the packet is not being sent to one or more other stack devices, the packet forwarder 100 removes 114 the packet from the stack device and reclaims the memory space used to store the packet.

If the packet is to be delivered to one or more other devices (e.g., routers) in the stack, the packet forwarder 100 identifies 116 the particular ports of the stack device to send the packet. In some arrangements, the packet forwarder 100 uses a stack device table, such as stack device table 68 (shown in FIG. 3) to determine the one or more ports. If the packet is to be sent over more than one port, the packet forwarder produces 118 a copy of the packet for each port. The packet forwarder 110 also produces 120 device vectors for each packet copy so that each packet is directed through the stack devices to their intended destinations. After producing the device vector or vectors, the packet forwarder 100 inserts 122 the device vectors the appropriate packets and sends 124 the packet(s) through the identified port(s) to the appropriate stack device or devices.

Particular embodiments have been described, however other embodiments are within the scope of the following claims. For example, the operations of packet classifier 80 or packet forwarder 100 can be performed in a different order and still achieve desirable results.

What is claimed is:

1. A method comprising:
receiving at a first packet forwarding device a packet including a vector inserted by a second packet forwarding device, wherein a stack of packet forwarding devices includes the first packet forwarding device and the second forwarding device, and wherein the vector comprises data that identifies a destination device external to the stack of packet forwarding devices;
based on the vector, determining at the first packet forwarding device whether at least one other packet forwarding device of the stack of packet forwarding devices is to receive the packet before the packet reaches the destination device, including determining whether the vector further comprises data that identifies the at least one other packet forwarding device; and
based on the determining whether at least one other packet forwarding device of the stack of packet forwarding devices is to receive the packet before the packet reaches the destination device:
removing the vector and sending the packet to the destination device; otherwise
inserting a second vector in the packet and sending the packet to the at least one other packet forwarding device.

2. The method of claim 1 further comprising:
using the vector and a table to determine a port for sending the packet from the first packet forwarding device.

3. The method of claim 2 further comprising:
copying the packet for sending through a second port identified by using the vector and the table.

4. The method of claim 1 wherein the vector includes a bit identifying the at least one other packet forwarding device in the stack of packet forwarding devices to receive the packet.

5. The method of claim 1 wherein the first packet forwarding device includes a router.

6. The method of claim 1 wherein the vector includes bits respectively identifying packet forwarding devices in the stack.

7. A non-transitory computer-readable storage medium having stored thereon instructions that, when executed by a processor, cause a machine to perform a method comprising:
receiving at a first packet forwarding device a packet including a vector inserted by a second packet forwarding device, wherein a stack of packet forwarding devices includes the first packet forwarding device and the second forwarding device, and wherein the vector comprises data that identifies a destination device external to the stack of packet forwarding devices;
based on the vector, determining at the first packet forwarding device whether at least one other packet forwarding device of the stack of packet forwarding devices is to receive the packet before the packet reaches the destination device, including determining whether the vector further comprises data that identifies the at least one other packet forwarding device; and
based on the determining whether at least one other packet forwarding device of the stack of packet forwarding devices is to receive the packet before the packet reaches the destination device:
removing the vector and sending the packet to the destination device; otherwise
inserting a second vector in the packet and sending the packet to the at least one other packet forwarding device.

8. The non-transitory computer-readable storage medium of claim 7 being further operable to cause a machine to:
use the vector and a table to determine a port for sending the packet from the first packet forwarding device.

9. The non-transitory computer-readable storage medium of claim 8 being further operable to cause a machine to:
copy the packet for sending through a second port identified by using the vector and the table.

10. The non-transitory computer-readable storage medium of claim 7 the vector includes a bit identifying the at least one other packet forwarding device in the stack of packet forwarding devices to receive the packet.

11. The non-transitory computer-readable storage medium of claim 7 wherein the first packet forwarding device includes a router.

12. The non-transitory computer-readable storage medium of claim 7 wherein the vector includes bits respectively identifying packet forwarding devices in the stack.

13. A packet forwarding device comprising:
an input port to receive a packet including a vector inserted by a second packet forwarding device, wherein a stack of packet forwarding devices includes the first packet forwarding device and the second forwarding device, and wherein the vector comprises data that identifies a destination device external to the stack of packet forwarding devices;
switch logic connected to the input port, the switch logic including circuitry configured to:
determine, based on the vector, whether at least one other packet forwarding device of the stack of packet forwarding devices is to receive the packet before the packet reaches the destination device, including the switch logic to determine whether the vector further comprises data that identifies the at least one other packet forwarding device; and
based on whether at least one other packet forwarding device of the stack of packet forwarding devices is to receive the packet before the packet reaches the destination device, the switch logic to:
remove the vector and send the packet to the destination device; otherwise insert a second vector in the packet and send the packet to the at least one other packet forwarding device.

14. The packet forwarding device of claim 13 wherein the switch logic to use the vector and a table to determine a port for sending the packet from the packet forwarding device.

* * * * *